(12) United States Patent
Brahm et al.

(10) Patent No.: US 9,453,431 B2
(45) Date of Patent: Sep. 27, 2016

(54) TILTING-SEGMENT RADIAL BEARING FOR A SINGLE-SHAFT TURBOMACHINE

(75) Inventors: Bernadette Brahm, Bochum (DE); Frank Bockel, Hennef (DE); Diethelm Dettmar, Wesel (DE); Anna Christina Droschinski, Mulheim an der Ruhr (DE); Bernd Luneburg, Mulheim an der Ruhr (DE); Umit Mermertas, Mulheim an der Ruhr (DE); Jan Soggeberg, Dorsten (DE); Marcel Stranger, Mulheim an der Ruhr (DE); Andreas Winkler, Duisburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 439 days.

(21) Appl. No.: 14/233,442

(22) PCT Filed: Jun. 15, 2012

(86) PCT No.: PCT/EP2012/061433
§ 371 (c)(1),
(2), (4) Date: Jan. 17, 2014

(87) PCT Pub. No.: WO2013/010735
PCT Pub. Date: Jan. 24, 2013

(65) Prior Publication Data
US 2014/0169955 A1    Jun. 19, 2014

(30) Foreign Application Priority Data
Jul. 20, 2011 (EP) .................................... 11174611

(51) Int. Cl.
*F01D 25/16* (2006.01)
*F16C 17/03* (2006.01)

(52) U.S. Cl.
CPC .............. *F01D 25/16* (2013.01); *F16C 17/03* (2013.01); *F16C 2229/00* (2013.01); *F16C 2360/23* (2013.01)

(58) Field of Classification Search
CPC .... F01D 25/16; F16C 17/03; F16C 2229/00; F16C 2360/23
USPC .... 416/174, 204 R, 204 A; 384/99, 117, 119
See application file for complete search history.

(56) References Cited

U.S. PATENT DOCUMENTS

| 2,348,928 | A | * | 5/1944 | Sampatacos | ............ F16C 17/03 29/898.054 |
| 2,936,197 | A | * | 5/1960 | Weiler | ................ F16C 32/0648 384/117 |

(Continued)

FOREIGN PATENT DOCUMENTS

| CA | 2084998 A1 | 10/1992 |
| CH | 668811 A5 | 1/1989 |
| CN | 1065913 A | 11/1992 |
| DE | 1425111 A1 | 2/1969 |
| DE | 1425111 B2 | 2/1969 |
| DE | 3202464 | 8/1983 |
| FR | 2574503 A1 | 6/1986 |
| JP | 60252817 | 12/1985 |
| JP | 03265708 B2 | 11/1991 |

*Primary Examiner* — Hoang Nguyen
(74) *Attorney, Agent, or Firm* — Beusse Wolter Sanks & Maire

(57) ABSTRACT

A tilting-segment radial bearing for a single-shaft turbomachine is provided, having a support ring, a tilting-segment mounting and a tilting segment, which in the installed state of the tilting-segment radial bearing is supported on the support ring such as to be seated on top and be radially displaceable by the tilting-segment mounting. The mounting has a preload device, by means of which the tilting segment is preloaded in the direction toward the shaft of the single-shaft turbomachine when the operating rotational speed of the single-shaft turbomachine is above a predetermined tilting-segment preload rotational speed, such that the tilting segment can be radially moved without preload when the operating rotational speed of the single-shaft turbomachine is below the tilting-segment preload rotational speed.

8 Claims, 2 Drawing Sheets

(56) References Cited

U.S. PATENT DOCUMENTS

| | | |
|---|---|---|
| 3,497,276 A | 2/1970 | McGrew, Jr. |
| 3,899,224 A * | 8/1975 | Schuller ............... F16C 17/035 384/103 |
| 4,627,746 A | 12/1986 | Grisel |
| 4,636,095 A | 1/1987 | Gerling |
| 5,531,523 A * | 7/1996 | Subbiah ................. F16C 17/03 384/114 |
| 6,012,386 A * | 1/2000 | Lahtinen .............. D21G 1/0226 100/170 |
| 6,623,164 B1 * | 9/2003 | Gozdawa ............... F16C 17/03 384/117 |

* cited by examiner

TILTING-SEGMENT RADIAL BEARING FOR A SINGLE-SHAFT TURBOMACHINE

CROSS REFERENCE TO RELATED APPLICATIONS

This application is the US National Stage of International Application No. PCT/EP2012/061433 filed Jun. 15, 2012, and claims the benefit thereof. The International Application claims the benefit of European Application No. EP11174611 filed Jul. 20, 2011. All of the applications are incorporated by reference herein in their entirety.

FIELD OF INVENTION

The invention relates to a tilting-segment radial bearing for a single-shaft turbomachine.

BACKGROUND OF INVENTION

A turbomachine, such as, for example, a single-shaft turbomachine, has a rotor with a shaft. What may be considered for mounting the shaft is, inter alia, a tilting-segment radial bearing in which the shaft can rotate about its axis. The tilting-segment radial bearing usually has three or four tilting segments, a distinction being made between lower and upper tilting segments. The lower tilting segments bear the weight of the shaft, its weight being diverted into a foundation via the lower tilting segments, the supporting ring and the bearing housing. The upper tilting segments, in the event of a fault, prevent the shaft from lifting off from the lower tilting segments and have a vibration-damping effect upon the shaft. The upper tilting segments either lie loosely on the shaft or are pressed onto the shaft by means of springs.

For lubrication and cooling, an oil flow is introduced through the tilting segments into the sealing gap between the shaft and the sliding surfaces of the tilting segments. When the shaft rotates, a hydrodynamic oil film, on which the shaft "floats", is formed. If imbalances occur during rotation, vibrations may arise. If the upper tilting segments lie loosely on the shaft, only slight vibration damping can emanate from them. Conventionally, for vibration damping, the upper tilting segments are pressed onto the shaft by means of springs. When the machine is shut down, the shaft has to be rotated slowly in what is known as a turn mode, so that it does not sag during cooling. In this turn mode and when the machine is started up, however, there is the disadvantage that the upper tilting segments press onto the shaft, since this may cause damage to the sliding surfaces of the tilting segments and to the surface of the shaft.

Furthermore, there can only be a small quantity of oil flowing into the sealing gap, and therefore only insignificant cooling occurs. Moreover, because of the poor sliding behavior in the turn mode, high drive forces are required, with the result that the efficiency of the machine decreases.

FR 2574503 A1 describes a hydrodynamic bearing in which a fluid connected to a pressure chamber is located in the gap between a shaft and a tilting segment, the pressure chamber exerting pressure upon the tilting segment. Further bearings are described in U.S. Pat. No. 3,497,276 A and DE 14 25 111 A1.

SUMMARY OF INVENTION

An object is to provide a tilting-segment radial bearing for a single-shaft turbomachine, the tilting-segment radial bearing allowing good vibration damping and being coolable effectively during operation.

The tilting-segment radial bearing according to the invention for a single-shaft turbomachine has a supporting ring, a tilting-segment mount and a tilting segment which, in the installed state of the tilting-segment radial bearing, is overhead and is supported radially displaceably on the supporting ring by the tilting-segment mount which has a prestressing device, by means of which the tilting segment is prestressed in the direction toward the shaft of the single-shaft turbomachine when the operating rotational speed of the single-shaft turbomachine lies above a predetermined tilting-segment prestress rotational speed, so that, when the operating rotational speed of the single-shaft turbomachine lies below the tilting-segment prestress rotational speed, the tilting segment is moveable, prestress-free, radially.

At a low rotational speed of the single-shaft turbomachine, the distance of the shaft from the lower tilting segments is short because a hydrodynamic oil film on which the shaft "floats" cannot be formed. In this case, the tilting segment of the tilting-segment radial bearing according to the invention lies only with its weight on the shaft. When the rotational speed of the shaft is increased, the hydrodynamic oil film is formed and lifts the shaft. When the predetermined tilting-segment prestress rotational speed is overshot, the shaft is at such a distance from the lower tilting segments that the prestressing device of the tilting-segment radial bearing according to the invention advantageously exerts pressure upon the shaft via the tilting segment.

The prestressing device is preferably designed in such a way that, when the single-shaft turbomachine is operating at an operating rotational speed above the tilting-segment prestress rotational speed, the prestress of the tilting segment increases with the operating rotational speed of the single-shaft turbomachine. The prestressing device preferably has a cup spring which is supported radially on the supporting ring and on the tilting segment. Furthermore, according to the invention, the prestressing device is designed in such a way that the prestress of the tilting segment has predetermined threshold prestress when the single-shaft turbomachine is operating at the prestess rotational speed. According to the invention, the tilting-segment mount has a holding part with a locking means, with a shank mounted radially displaceably on the supporting ring and with a plate, on which the tilting segment is supported radially on the inside and the prestressing device is supported radially on the outside, the shank being secured in a limited manner to the supporting ring by the locking means in such a way that the tilting segment is supported on the plate and is prestressed with the threshold prestress by the prestressing device when the operating rotational speed of the single-shaft turbomachine is identical to the tilting-segment prestress rotational speed.

Preferably, the radial movement of the tilting segment is limited outwardly. Furthermore, the plate preferably has on its radially outer side, for butting against the supporting ring, an abutment, by which the radial movement of the tilting segment is limited outwardly. Moreover, the shank preferably projects from the plate radially inward with a projection which is in engagement with the tilting segment, so that the tilting segment is mounted radially displaceably and fixedly in the circumferential direction. Preferably, the tilting-segment mount has a holding pin, by means of which the minimum radial position of the tilting-segment radial bearing is limited such that the tilting segment does not come out of engagement with the projection. Furthermore, the holding part, during its radial displacement, is preferably guided radially on the supporting ring.

When the single-shaft turbomachine rotates at a rotational speed below the tilting-segment prestress rotational speed, the tilting segment of the tilting-segment radial bearing according to the invention can advantageously, guided radially, move freely on the projection of the shank. When the rotational speed of the machine reaches the tilting-segment prestress rotational speed, a force originating from the predetermined threshold prestress of the cup spring advantageously acts in addition to the weight of the tilting segment. Furthermore, vibrations of the shaft can advantageously be damped by the cup spring.

BRIEF DESCRIPTION OF THE DRAWINGS

A preferred embodiment of the tilting-segment radial bearing according to the invention is explained below by means of the accompanying diagrammatic drawings in which.

DETAILED DESCRIPTION OF INVENTION

Figure 1:
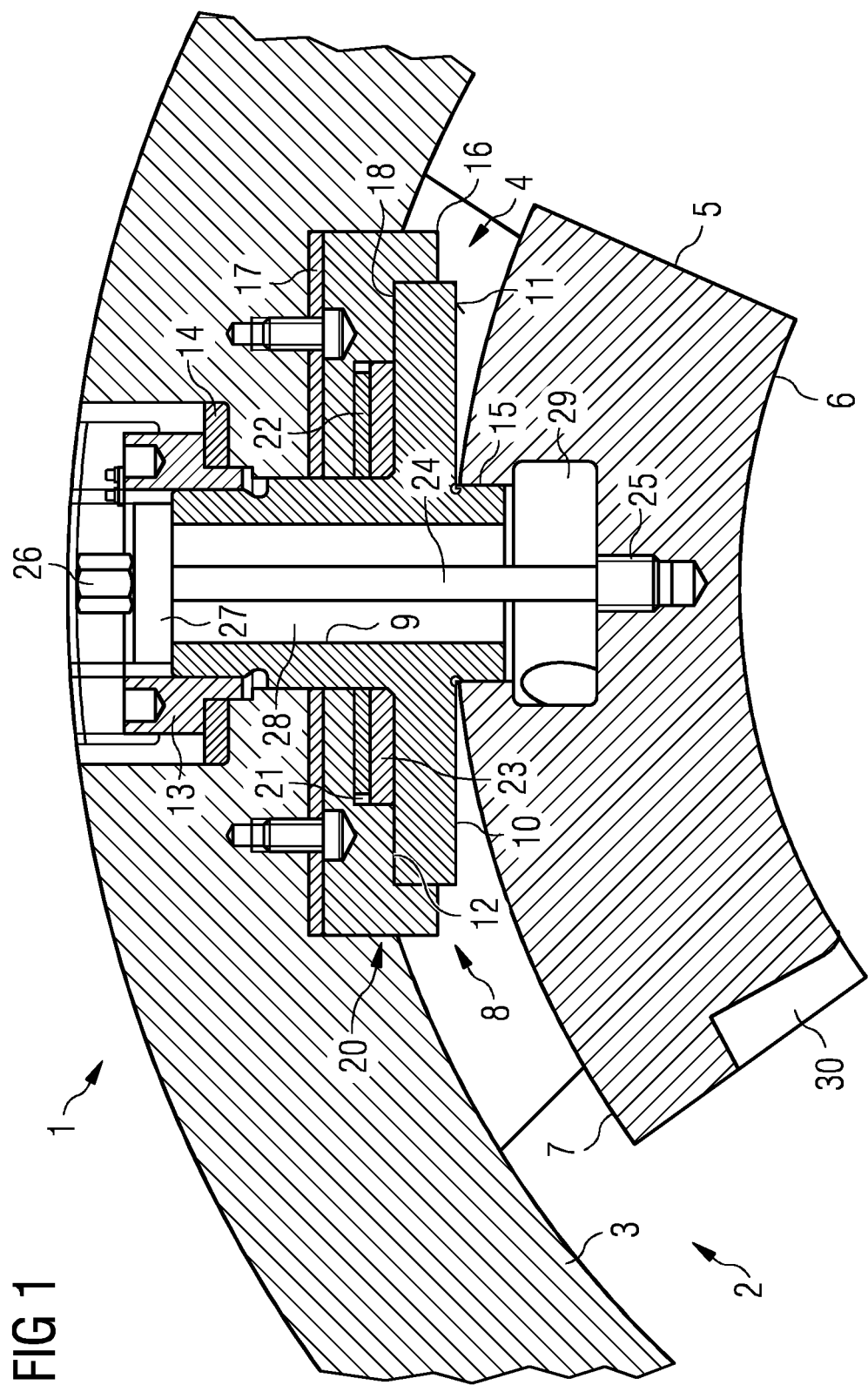
FIG. 1 shows a cross section through the embodiment of the tilting-segment radial bearing according to the invention with an overhead tilting segment.
Figure 2:
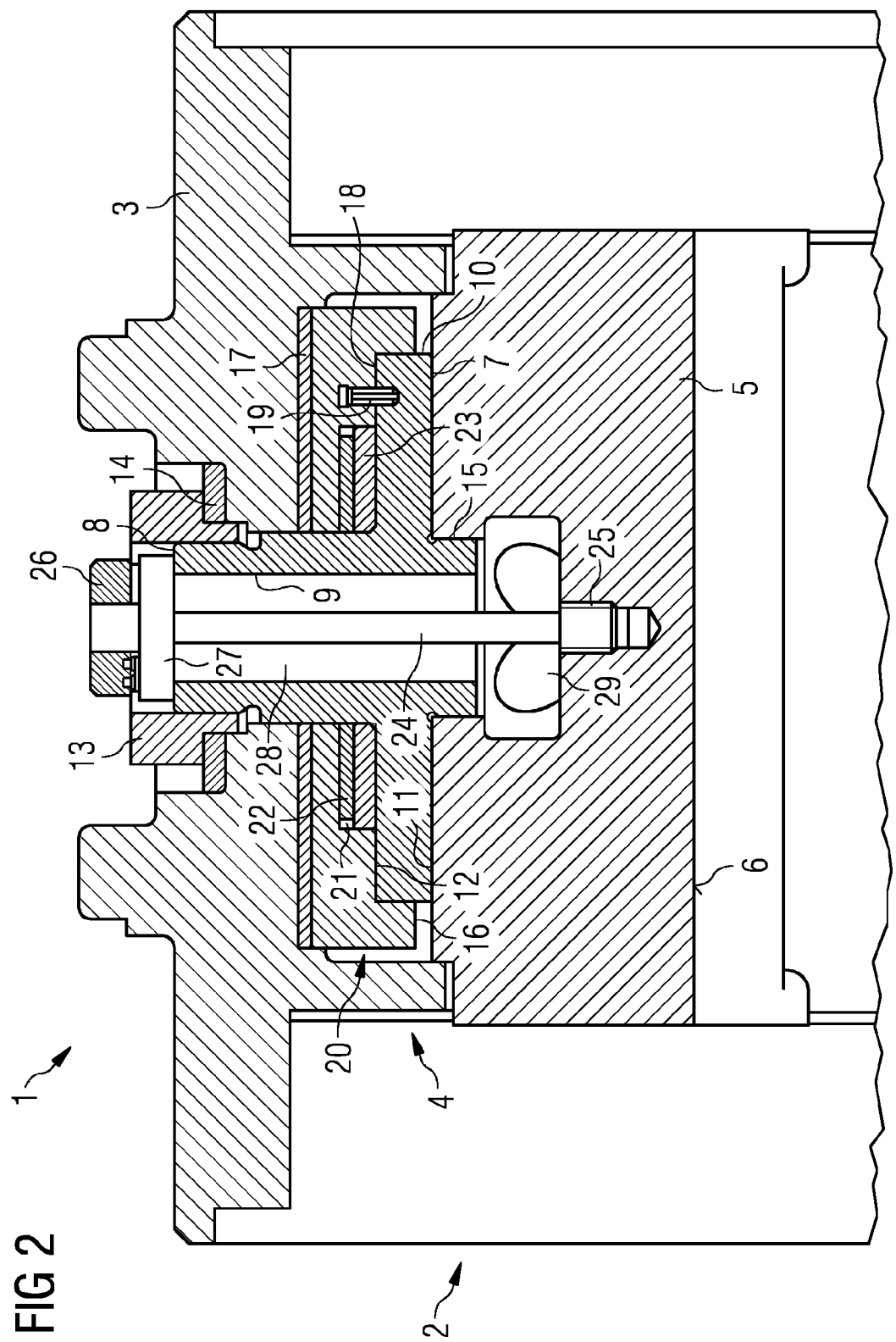
FIG. 2 shows a longitudinal section through the overhead tilting segment of the embodiment.

As is clear from FIGS. 1 and 2, a tilting-segment radial bearing 1 has in its upper bearing half 2 a supporting ring 3, a tilting segment 5 and a tilting-segment mount 4, by means of which the tilting segment 5 is fastened to the supporting ring 3. Located on the radial inside of the tilting segment 4 is the tilting-segment sliding surface 6 which is a cylindrical surface, the axis of rotation of which coincides with the machine axis in the installed state. In the installed state, the tilting segment 5 lies on a shaft. The tilting segment 5 has, on the side facing away from the tilting-segment sliding surface 6, a tilting-segment back 7 which is parallel to the tilting-segment sliding surface 6.

As is clear from FIGS. 1 and 2, the tilting-segment mount 4 has a holding part 8 of hollow form which is mounted radially displaceably on the supporting ring 3 by means of a shank 9. Furthermore, the holding part 8 has a plate 10 lying on the outside in the axial direction and in the circumferential direction. Moreover, the holding part 8 has, on the radially inner plate inside 11, a projection 15, the inside of which forms in the axial direction and in the circumferential direction a continuous surface with the inside of the shank 9.

As is clear from FIGS. 1 and 2, a prestressing device 20 is supported on the plate outside 12 facing away from the plate inside 11. The prestressing device 20 has a cup spring 22, a shim 23, a shoe 16, a compensating washer 17 and a ring nut 13. The spring force of the cup spring 22 is directed radially. The shim 23 bears radially on the inside on the plate outside 12 and is arranged in the axial direction on the shank 9. The cup spring 22 lies radially on the inside on the shim 23 and is arranged in the axial direction on the shank 9. The shoe 16 is introduced in a clearance in the inside of the supporting ring 3, the shoe 16 bearing radially on the inside against the cup spring 22. The compensating washer 17 is introduced between the shoe 16 and the supporting ring 3. The ring nut 13 is attached to the radially outer end of the shank 9 and axially on the outside and is supported via a supporting washer 14 in an outer clearance of the supporting ring 3.

As is clear from FIGS. 1 and 2, the shoe 16 has an abutment 18, against which the plate 10 can butt during its radial movement, so that the radial movement is limited outwardly. The shim 23 has a longer axial extent than the cup spring 22 so as to form between the cup spring 22 and the abutment 18 a cup-spring cavity 21 in which the cup spring 22 can expand axially during compression.

As is clear from FIGS. 1 and 2, the projection 15 is in engagement with the tilting segment 5 on the tilting-segment back 7, so that the tilting segment 5 is guided radially on the projection 15. A thread 25, into which the lower end of a holding pin 24 is introduced, is introduced in the tilting segment 5 on its tilting-segment back 7. The holding pin 24 is guided through the holding part 8 of hollow form and a hole plate 27 which is supported on the outer end of the holding part 8. The holding pin 24 is provided on the outside of the hole plate 27 with a holding nut 26, by means of which the holding pin 24 is supported on the hole plate 27, so that the minimum radial position of the tilting segment 5 is secured.

As is clear from FIGS. 1 and 2, the tilting segment 5 can move in a manner guided radially on the projection 15 and only under the influence of its weight. When the shaft rotates at the tilting-segment prestress rotational speed, it "floats" on a hydrodynamic film and the tilting segment 5 lying on the shaft butts with its tilting-segment back 7 against the plate inside 11, and a force originating from the threshold prestress, set by the prestressing device 20, of the cup spring 22 acts upon the tilting segment 5 in addition to the weight.

As is clear from FIGS. 1 and 2, an oil duct 28 is formed in the cavity between the holding pin 24 and the holding part 8 and issues in an oil plenum 29 formed in the tilting segment 5. An oil outlet 30 is provided in the tilting-segment sliding surface 6 and is connected to the oil plenum 29.

As is clear from FIG. 2, a radially oriented guide pin 19 is provided in a hole of the plate 10 and of the abutment 18, so that the holding part 8, during it radial displacement, is guided radially on the supporting ring 3.

To preset the play of the tilting segments 5, the tilting-segment radial bearing 1 is arranged on edge and a dummy shaft is introduced into the tilting-segment radial bearing 1. The desired threshold prestress is set via the thickness of the shim 17. The ring nut 13 is then screwed down as firmly as possible and the holding nut 26 is tightened to an extent such that the tilting segment 5 just avoids lying on the dummy shaft. In this arrangement, the maximum play of the tilting segment 5 is measured, and if the play does not comply with a mounting specification, the thickness of the compensating washer 17 is adapted. The ring nut 13 is subsequently loosened to an extent such that the tilting segment 5 hangs with predetermined play above the shaft. This position of the ring nut 13 is identified by a marking.

For the final setting of the play, after the tilting-segment radial bearing 1 has been installed in a machine housing and the shaft has been installed in the tilting-segment radial bearing, the ring nut 13 is first screwed down as firmly as possible and the maximum play is measured. If appropriate, the thickness of the compensating washer 17 is adapted. The ring nut 13 is subsequently loosened as far as the marking and the play is measured. The play is adapted, where appropriate, by readjusting the ring nut 13. Finally, the holding nut 26 is loosened to an extent such that the tilting segment 5 lies loosely on the shaft, and the ring nut 13 and holding nut 26 are secured against rotation.

The invention claimed is:

1. A tilting-segment radial bearing for a single-shaft turbomachine, comprising:
   a supporting ring, a tilting-segment mount and a tilting segment which, in the installed state of the tilting-segment radial bearing, is overhead and is supported radially displaceably on the supporting ring by the tilting-segment mount which has a prestressing device and a holding part with a locking means, with a shank mounted radially displaceably on the supporting ring and with a plate which projects on and is fastened to the shank and on which the tilting segment can be supported radially on the inside and the prestressing device can be supported radially on the outside, the shank being secured in a limited manner to the supporting ring radially on the inside by the locking means in such a way that the tilting segment is supported on the plate and is prestressed with a predetermined threshold prestress by the prestressing device only when the operating rotational speed of the single-shaft turbomachine is identical to a predetermined tilting-segment prestress rotational speed, wherein, at all the operating rotational speeds of the single-shaft turbomachine above the tilting-segment prestress rotational speed, the tilting segment is prestressed in the direction toward the shaft of the single-shaft turbomachine by the prestressing device, and, at all the operating rotational speeds of the single-shaft turbomachine below the tilting-segment prestress rotational speed, the tilting segment is moveable, prestress-free, radially.

2. The tilting-segment radial bearing as claimed in claim 1, wherein the prestressing device is adapted such that, when the single-shaft turbomachine is operating at an operating rotational speed above the tilting-segment prestress rotational speed, the prestress of the tilting segment increases with the operating rotational speed of the single-shaft turbomachine.

3. The tilting-segment radial bearing as claimed in claim 2, wherein the prestressing device comprises a cup spring which is supported radially on the supporting ring and on the tilting segment.

4. The tilting-segment radial bearing as claimed in claim 1, wherein the radial movement of the tilting segment is limited outwardly.

5. The tilting-segment radial bearing as claimed in claim 4, wherein the plate comprises on its radially outer side, for butting against the supporting ring, an abutment, by which the radial movement of the tilting segment is limited outwardly.

6. The tilting-segment radial bearing as claimed in claim 1, wherein the shank projects from the plate radially inward with a projection which is in engagement with the tilting segment, so that the tilting segment is mounted radially displaceably and fixedly in the circumferential direction.

7. The tilting-segment radial bearing as claimed in claim 6, wherein the tilting-segment mount comprises a holding pin, by means of which the minimum radial position of the tilting-segment radial bearing is limited such that the tilting segment does not come out of engagement with the projection.

8. The tilting-segment radial bearing as claimed in claim 1, wherein the holding part, during its radial displacement, is guided radially on the supporting ring.

* * * * *